(12) United States Patent
Song

(10) Patent No.: US 9,774,809 B2
(45) Date of Patent: Sep. 26, 2017

(54) IMAGE SENSING DEVICE WITH ANALOG-DITHERING SCHEME

(71) Applicant: SK hynix Inc., Gyeonggi-do (KR)

(72) Inventor: Jung-Eun Song, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 33 days.

(21) Appl. No.: 14/850,663

(22) Filed: Sep. 10, 2015

(65) Prior Publication Data

US 2016/0309109 A1 Oct. 20, 2016

(30) Foreign Application Priority Data

Apr. 17, 2015 (KR) .................. 10-2015-0054205

(51) Int. Cl.
*H04N 5/376* (2011.01)
*H04N 5/374* (2011.01)
*H04N 5/378* (2011.01)
*H04N 5/3745* (2011.01)

(52) U.S. Cl.
CPC ........... *H04N 5/3765* (2013.01); *H04N 5/378* (2013.01); *H04N 5/3745* (2013.01)

(58) Field of Classification Search
None
See application file for complete search history.

(56) References Cited

U.S. PATENT DOCUMENTS

| | | | | |
|---|---|---|---|---|
| 5,049,998 A * | 9/1991 | Lee | ................... | G06F 17/17 348/241 |
| 7,190,358 B2 * | 3/2007 | Hiroki | ................... | G09G 3/3614 345/204 |
| 2003/0058144 A1 * | 3/2003 | Nakada | ................ | H03M 1/0626 341/141 |
| 2005/0057380 A1 * | 3/2005 | Na | .................. | H03M 1/1205 341/123 |
| 2006/0022119 A1 * | 2/2006 | Tinkler | ................... | H04N 5/335 250/214 R |
| 2008/0012652 A1 * | 1/2008 | Dan | .................... | H03K 3/0315 331/57 |
| 2008/0238743 A1 * | 10/2008 | Koyama | ............... | H03M 3/328 341/131 |
| 2011/0187907 A1 * | 8/2011 | Takahashi | ............. | H01L 27/146 348/302 |

(Continued)

FOREIGN PATENT DOCUMENTS

| | | | | |
|---|---|---|---|---|
| JP | WO 2013122221 A1 * | 8/2013 | .............. | H03M 1/14 |
| JP | WO 2015079663 A1 * | 6/2015 | ........... | H03K 23/005 |
| KR | 1020120061523 | 6/2012 | | |

*Primary Examiner* — Roberto Velez
*Assistant Examiner* — Cynthia Segura
(74) *Attorney, Agent, or Firm* — IP & T Group LLP

(57) ABSTRACT

An image sensing device includes: a clock signal control block suitable for generating first and second clock control signals to have variable logic combinations for each unit row time; a frequency division block suitable for generating first and second clock signals having different phases based on a reference clock signal and controlling a first delay time reflected in the first clock signal and a second delay time reflected in the second clock signal for each unit row time based on the first and a second clock control signals; and a pixel signal processing block suitable for converting a pixel signal inputted for each unit row time into a digital signal based on the first and second clock signals.

15 Claims, 14 Drawing Sheets

(56) References Cited

U.S. PATENT DOCUMENTS

| | | | |
|---|---|---|---|
| 2011/0235459 A1* | 9/2011 | Ware | G11C 7/04 |
| | | | 365/233.11 |
| 2012/0013494 A1* | 1/2012 | Song | H03M 1/12 |
| | | | 341/122 |
| 2012/0306539 A1* | 12/2012 | Chung | H03K 5/135 |
| | | | 327/39 |
| 2013/0243147 A1* | 9/2013 | Kim | H03M 1/0863 |
| | | | 377/42 |
| 2013/0278453 A1* | 10/2013 | Steensgaard-Madsen | H03M 1/0668 |
| | | | 341/110 |
| 2014/0166857 A1* | 6/2014 | Ookuma | H04N 5/378 |
| | | | 250/208.1 |
| 2014/0320324 A1* | 10/2014 | Canard | G04F 10/005 |
| | | | 341/131 |
| 2015/0138413 A1* | 5/2015 | Sato | H04N 5/378 |
| | | | 348/302 |
| 2015/0280726 A1* | 10/2015 | Terazawa | H03M 1/146 |
| | | | 341/157 |
| 2016/0182075 A1* | 6/2016 | Devarajan | H03M 1/1019 |
| | | | 341/120 |

\* cited by examiner

| SEL_I | 0 | 1 | 0 | 1 |
| --- | --- | --- | --- | --- |
| SEL_Q | 0 | 0 | 1 | 1 |
| MODE | Normal | Dithering1 | Dithering2 | Dithering3 |

<Normal>

<Dithering 1>

<Dithering 2>

<Dithering 3>

IMAGE SENSING DEVICE WITH ANALOG-DITHERING SCHEME

CROSS-REFERENCE TO RELATED APPLICATIONS

The present application claims priority of Korean Patent Application No. 10-2015-0054205, filed on Apr. 17, 2015, which is incorporated herein by reference in its entirety.

BACKGROUND

1. Field

Various embodiments of the present invention relate to an electronic circuit design technology, and more particularly, to an image sensing device.

2. Description of the Related Art

Image sensing devices capture images using the photosensitive properties of semiconductor materials. Image sensing devices can be classified into charge coupled device (CCD) image sensors and complementary metal oxide semiconductor (CMOS) image sensors. The CMOS image sensing devices allow for analog circuits and digital control circuits to be realized on a single integrated circuit (IC).

An image sensing device includes an analog-to-digital converter (ADC) to convert an analog signal (i.e., a pixel signal outputted from a pixel array) into a digital signal. The ADC generally uses a clock when converting the analog signal to the digital signal. The operation speed and power consumption of the ADC have a direct influence on the performance of the image sensing device.

Recently, to increase the operation speed and reduce power consumption of the ADC, image sensing devices have been adopting a double data rate (hereinafter referred to as "DDR") scheme and, by extension, a quad data rate (hereinafter referred to as "QDR") scheme. The DDR scheme uses a single clock signal having a frequency that is half of a source clock signal, and the QDR scheme uses two clock signals having a frequency that is a quarter of the source clock signal. Accordingly, the power consumption of the DDR scheme is substantially the same as that of the QDR scheme. However, the QDR scheme has an advantage in that the QDR scheme uses an internal clock signal that has a lower frequency than that of the DDR scheme.

FIG. 1 is a block diagram illustrating a conventional image sensing device 100 on the basis of the QDR scheme.

Referring to FIG. 1, the image sensing device 100 includes a control block 110, a ramp voltage generation block 120, a frequency division block 130, a pixel array 140, and a pixel signal processing block 150.

The control block 110 generates operation control signals ROW_CTRLs for controlling operations of the pixel array 140 by rows for each unit row time.

The ramp voltage generation block 120 generates a ramp voltage VRAMP having a predetermined ramp up/down pattern for each unit row time. For example, the ramp voltage generation block 120 generates the ramp voltage VRAMP increasing or dropping by a predetermined voltage for each unit row time.

The frequency division block 130 divides the frequency of a reference clock signal CLK_REF by a predetermined division ratio to generate a first control clock signal CNT_CLK_I and a second control clock signal CNT_CLK_Q. For example, the frequency division block 130 generates the first control clock signal CNT_CLK_I by dividing the frequency of the reference clock signal CLK_REF by 2, and generates the second control clock signal CNT_CLK_Q by dividing the frequency of an inverted signal of the reference clock signal CLK_REF by 2. Herein, the first control clock signal CNT_CLK_I and the second control clock signal CNT_CLK_Q have a phase difference of approximately 90 degrees.

The pixel array 140 includes x*y pixels (not shown) arranged in column and row directions, where x and y are natural numbers corresponding to the numbers of columns and rows, respectively. The pixel array 140 sequentially outputs first to $x^{th}$ pixel signals VPXL1 to VPXLx by rows y times in response to the operation control signals ROW_CTRLs. In other words, the pixel array 140 outputs the first to $x^{th}$ pixel signals VPXL1 to VPXLx for each unit row time.

The pixel signal processing block 150 includes first to $x^{th}$ analog-to-digital converters ADC1 to ADCx corresponding to the respective first to $x^{th}$ pixel signals VPXL1 to VPXLx. The first to $x^{th}$ analog-to-digital converters ADC1 to ADCx generate first to $x^{th}$ digital signals D1<k:0> to Dx<k:0> corresponding to the first to $x^{th}$ pixel signals VPXL1 to VPXLx based on the ramp voltage VRAMP, the first control clock signal CNT_CLK_I and the second control clock signal CNT_CLK_Q, where k is a natural number. For example, the first to $x^{th}$ analog-to-digital converters ADC1 to ADCx detect voltages of the first to $x^{th}$ pixel signals VPXL1 to VPXLx based on the ramp voltage VRAMP, respectively, and generate the first to $x^{th}$ digital signals D1<k:0> to Dx<k:0> corresponding to the detection result in response to the first control clock signal CNT_CLK_I and the second control clock signal CNT_CLK_Q.

FIG. 2 is a timing diagram for describing an operation of the image sensing device 100 shown in FIG. 1. For the sake of convenience in description, FIG. 2 shows the operation of the first analog-to-digital converter ADC1 among the first to $x^{th}$ analog-to-digital converters ADC1 to ADCx. The operation of the first analog-to-digital converter ADC1 is representatively described below.

Referring to FIG. 2, the pixel array 140 outputs the first pixel signal VPXL1 from a pixel (not shown) corresponding to a first row and a first column during a first unit row time in response to the operation control signals ROW_CTRLs. The pixel array 140 outputs a first reset signal VPXL1_RST as the first pixel signal VPXL1 during a first reset period of the first unit row time and a first data signal VPXL1_SIG as the first pixel signal VPXL1 during a first read-out period of the first unit row time.

An operation corresponding to the first reset period is as follows. The first analog-to-digital converter ADC1 detects a voltage of the first reset signal VPXL1_RST based on the ramp voltage VRAMP. For example, the first analog-to-digital converter ADC1 generates the first digital signal D1<k:0> corresponding to a section ranging from when the ramp voltage VRAMP ramps down to when the ramp voltage VRAMP has the same level as the first reset signal VPXL1_RST. The first analog-to-digital converter ADC1 generates the first digital signal D1<k:0> based on the first control clock signal CNT_CLK_I and the second control clock signal CNT_CLK_Q having a phase difference of approximately 90 degrees.

Subsequently, the operation corresponding to the first read-out period is as follows. The first analog-to-digital converter ADC1 detects a voltage of the first data signal VPXL1_SIG based on the ramp voltage VRAMP. For example, the first analog-to-digital converter ADC1 generates the first digital signal D1<k:0> corresponding to a section ranging from when the ramp voltage VRAMP ramps down to when the ramp voltage VRAMP has the same level as the first data signal VPXL1_SIG. The first analog-todigital converter ADC1 generates the first digital signal D1<k:0> based on the first control clock signal CNT_CLK_I and the second control clock signal CNT_CLK_Q.

Subsequently, although not illustrated in the drawings, the pixel array 140 sequentially outputs the first pixel signal VPXL1 from pixels (not shown) corresponding to second to $y^{th}$ rows and the first column during second to $y^{th}$ unit row times in response to the operation control signals ROW_CTRLs. Then, the first analog-to-digital converter ADC1 sequentially generates the first digital signal D1<k:0> during the second to $y^{th}$ unit row times through the same process as above.

Each of the first to $x^{th}$ analog-to-digital converters ADC1 to ADCx has its own offset. In other words, the image sensing device 100 has offsets for each column based on the first to $x^{th}$ analog-to-digital converters ADC1 to ADCx. The column offsets result in column fixed pattern noise (CFPN). To be specific, the first analog-to-digital converter ADC1 generates the first digital signal D1<k:0> in which a code offset corresponding to its offset is reflected for each unit row time. The code offset causes a miscode of the first digital signal D1<k:0>, which is a code signal. Therefore, the code offset corresponding to the offset of the first analog-to-digital converter ADC1 is reflected in the first digital signal D1<k:0>, and consequently this causes the CFPN. For example, when the first analog-to-digital converter ADC1 has a positive (+) value offset, a CFPN that is overly bright compared with other columns may occur in the first column. On the other hand, when the first analog-to-digital converter ADC1 has an offset of a negative (−) value, a CFPN that is overly dark compared with other columns may occur in the first column.

FIG. 3 is a graph for describing the concern of the image sensing device 100 shown in FIG. 1. For convenience, FIG. 3 representatively shows the first pixel signal VPXL1.

Referring to FIG. 3, a horizontal axis indicates unit row times, and a vertical axis indicates a voltage of the first pixel signal VPXL1. For convenience, the numbers 0, 1, 2, 3, 4, 5, 6, 7, ... shown in the graph indicate the first digital signal D1<k:0> corresponding to the voltage of the first pixel signal VPXL1 as decimal numbers.

The first analog-to-digital converter ADC1 generates the first digital signal D1<k:0> corresponding to the voltage of the first pixel signal VPXL1. The first analog-to-digital converter ADC1 generates the first digital signal D1<k:0> having a consistent value based on the voltage of the first pixel signal VPXL1 for each unit row time. For example, when the first pixel signal VPXL1 having the same voltage LV1 for each unit row time is generated, the first analog-to-digital converter ADC1 may generate the first digital signal D1<k:0> corresponding to the decimal number '2' for each unit row time.

The code offset corresponding to an offset Voffset of the first analog-to-digital converter ADC1 is equally reflected in the first digital signal D1<k:0> for each unit row time. Accordingly, the CFPN corresponding to the offset Voffset of the first analog-to-digital converter ADC1 occurs in the first column.

SUMMARY

Various embodiments of the present invention are directed to an image sensing device in which column offsets are reflected for each unit row time.

In accordance with an embodiment of the present invention, an image sensing device may include: a clock signal control block suitable for generating first and second clock control signals to have variable logic combinations for each unit row time; a frequency division block suitable for generating first and second clock signals having different phases based on a reference clock signal and controlling a first delay time reflected in the first clock signal and a second delay time reflected in the second clock signal for each unit row time based on the first and a second clock control signals; and a pixel signal processing block suitable for converting a pixel signal inputted for each unit row time into a digital signal based on the first and second clock signals.

The clock signal control block may generate the first and second clock control signals of irregular logic combinations.

The frequency division block irregularly may control the first and second delay times.

The digital signal generated by the pixel signal processing block may be analog-dithered.

The frequency division block may include: a first division unit suitable for dividing the frequency of the reference clock signal by 2 to generate a first divided clock signal; a first delay unit suitable for delaying the first divided clock signal by a predetermined delay time to generate a first delayed clock signal; a first selection unit suitable for selecting one of the first divided clock signal and the first delayed clock signal as the first clock signal based on the first clock control signal; a second division unit suitable for dividing the frequency of an inverted signal of the reference clock signal by 2 to generate a second divided clock signal; a second delay unit suitable for delaying the second divided clock signal by the predetermined delay time to generate a second delayed clock signal; and a second selection unit suitable for selecting one of the second divided clock signal and the second delayed clock signal as the second clock signal based on the second clock control signal.

The predetermined delay time may be shorter than a quarter of a cycle of the reference clock signal.

The clock signal control block may further generate a third clock control signal and a fourth clock control signal to have variable logic combinations for each unit row time, and the frequency division block irregularly may control the first and second delay times for each unit row time based on the first to fourth clock control signals.

The frequency division block may include: a first division unit suitable for dividing the frequency of the reference clock signal by 2 to generate a first divided clock signal; a first delay unit suitable for delaying the first divided clock signal by a predetermined delay time to generate a first delayed clock signal; a second delay unit suitable for delaying the first delayed clock signal by the predetermined delay time to generate a second delayed clock signal; a third delay unit suitable for delaying the second delayed clock signal by the predetermined delay time to generate a third delayed clock signal; a first selection unit suitable for selecting one of the first divided clock signal and the first delayed clock signal as a first selection clock signal based on the first clock control signal; a second selection unit suitable for selecting one of the second delayed clock signal and the third delayed clock signal as a second selection clock signal based on the first clock control signal; a third selection unit suitable for selecting one of the first selection clock signal and the second selection clock signal as the first clock signal based on the third clock control signal; a second division unit suitable for dividing the frequency of an inverted signal of the reference clock signal by 2 to generate a second divided clock signal; a fourth delay unit suitable for delaying the second divided clock signal by the predetermined delay time to generate a fourth delayed clock signal; a fifth delay unit suitable for delaying the fourth delayed clock signal by the predetermined delay time to generate a fifth delayed clock signal; a sixth delay unit suitable for delaying the fifth delayed clock signal by the predetermined delay time to generate a sixth delayed clock signal; a fourth selection unit suitable for selecting one of the second divided clock signal and the fourth delayed clock signal as a third selection clock signal based on the second clock control signal; a fifth selection unit suitable for selecting one of the fifth delayed clock signal and the sixth delayed clock signal as a fourth selection clock signal based on the second clock control signal; and a sixth selection unit suitable for selecting one of the third selection clock signal and the fourth selection clock signal as the second clock signal based on the fourth clock control signal.

The predetermined delay time may be shorter than a quarter of a cycle of the reference clock signal.

In accordance with another embodiment of the present invention, an image sensing device may include: a pixel array suitable for outputting a pixel signal by rows for each unit row time; a ramp voltage generation block suitable for generating a ramp voltage having a predetermined ramp up/down pattern for each unit row time; and a pixel signal processing block suitable for converting the pixel signal into a digital signal based on first and second divided clock signals whose phases are equally or differently controlled for each unit row time.

The image sensing device may further include: a clock signal control block suitable for generating first and second clock control signals to have variable logic combinations for each unit row time; and a frequency division block suitable for generating the first and second divided clock signals with different phases based on a reference clock signal and controlling a first delay time reflected in the first clock signal and a second delay time reflected in the second clock signal for each unit row time based on the first and second clock control signals.

The clock signal control block may generate the first and second clock control signals of irregular logic combinations, and the frequency division block irregularly controls the first and second delay time, and the pixel signal processing block outputs the digital signal that is analog-dithered.

The frequency division block may include: a first division unit suitable for dividing the frequency of the reference clock signal by 2 to generate a first divided clock signal; a first delay unit suitable for delaying the first divided clock signal by a predetermined delay time to generate a first delayed clock signal; a first selection unit suitable for selecting one of the first divided clock signal and the first delayed clock signal as the first clock signal based on the first clock control signal; a second division unit suitable for dividing the frequency of an inverted signal of the reference clock signal by 2 to generate a second divided clock signal; a second delay unit suitable for delaying the second divided clock signal by the predetermined delay time to generate a second delayed clock signal; and a second selection unit suitable for selecting one of the second divided clock signal and the second delayed clock signal as the second clock signal based on the second clock control signal.

The predetermined delay time may be shorter than a quarter of a cycle of the reference clock signal.

The clock signal control block may further generate a third clock control signal and a fourth clock control signal to have variable logic combinations for each unit row time, and the frequency division block irregularly may control the first and second delay times for each unit row time based on the first to fourth clock control signal's.

The frequency division block may include: a first division unit suitable for dividing the frequency of the reference clock signal by 2 to generate a first divided clock signal; a first delay unit suitable for delaying the first divided clock signal by a predetermined delay time to generate a first delayed clock signal; a first second delay unit suitable for delaying the first delayed clock signal by the predetermined delay time to generate a second delayed clock signal; a third delay unit suitable for delaying the second delayed clock signal by the predetermined delay time to generate a third delayed clock signal; a first selection unit suitable for selecting one of the first divided clock signal and the first delayed clock signal as a first selection clock signal based on the first clock control signal; a second selection unit suitable for selecting one of the second delayed clock signal and the third delayed clock signal as a second selection clock signal based on the first clock control signal; a third selection unit suitable for selecting one of the first selection clock signal and the second selection clock signal as the first clock signal based on the third clock control signal; a second division unit suitable for dividing the frequency of an inverted signal of the reference clock signal by 2 to generate a second divided clock signal; a fourth delay unit suitable for delaying the second divided clock signal by the predetermined delay time to generate a fourth delayed clock signal; a fifth delay unit suitable for delaying the fourth delayed clock signal by the predetermined delay time to generate a fifth delayed clock signal; a sixth delay unit suitable for delaying the fifth delayed clock signal by the predetermined delay time to generate a sixth delayed clock signal; a fourth selection unit suitable for selecting one of the second divided clock signal and the fourth delayed clock signal as a third selection clock signal based on the second clock control signal; a fifth selection unit suitable for selecting one of the fifth delayed clock signal and the sixth delayed clock signal as a fourth selection clock signal based on the second clock control signal; and a sixth selection unit suitable for selecting one of the third selection clock signal and the fourth selection clock signal as the second clock signal based on the fourth clock control signal.

The predetermined delay time may be shorter than one $12^{th}$ of a cycle of the reference clock signal.

DETAILED DESCRIPTION

Exemplary embodiments of the present invention are described below in more detail with reference to the accompanying drawings. These embodiments are provided so that this disclosure is thorough and complete, and fully conveys the scope of the present invention to those skilled in the art. All "embodiments" referred to in this disclosure refer to embodiments of the inventive concept disclosed herein. The embodiments presented are merely examples and are not intended to limit the inventive concept.

The drawings are not necessarily to scale and, in some instances, proportions may have been exaggerated to clearly illustrate features of the embodiments. It is also noted that in this specification, "connected/coupled" refers to one component not only directly coupling another component, but also indirectly coupling another component through an intermediate component. In addition, a singular form may include a plural form as long as it is not specifically mentioned.

The terminology used herein is for the purpose of describing particular embodiments only and is not intended to limit the inventive concept. As used herein, the singular forms "a", "an" and "the" are intended to include the plural forms as well, unless the context clearly indicates otherwise. It will be further understood that the terms "comprises" and/or "comprising," when used in this specification, indicate the presence of stated features, but do not preclude the presence or addition of one or more other features. As used herein, the term "and/or" indicates any and all combinations of the one or more listed items.

Figure 1:
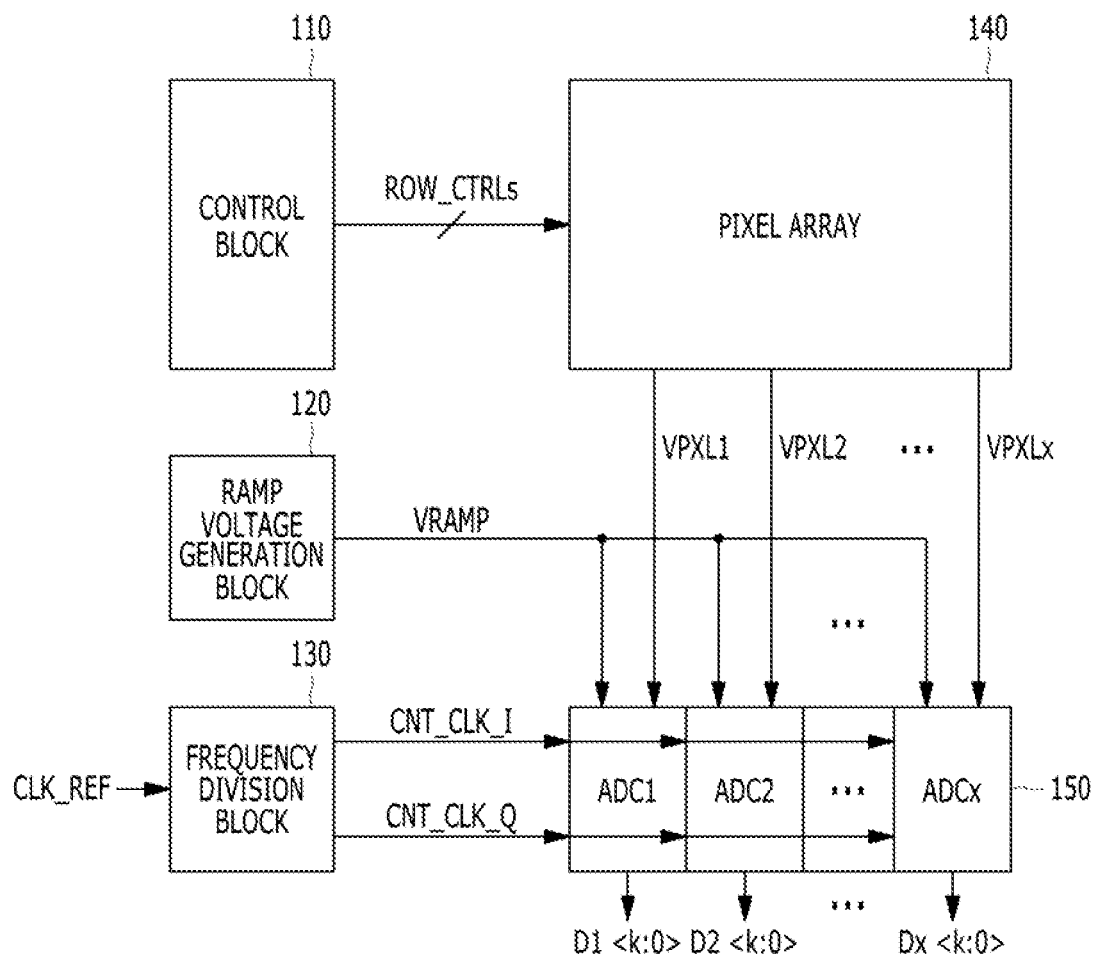
FIG. 1 is a block diagram illustrating a conventional image sensing device utilizing a QDR scheme.
Figure 2:
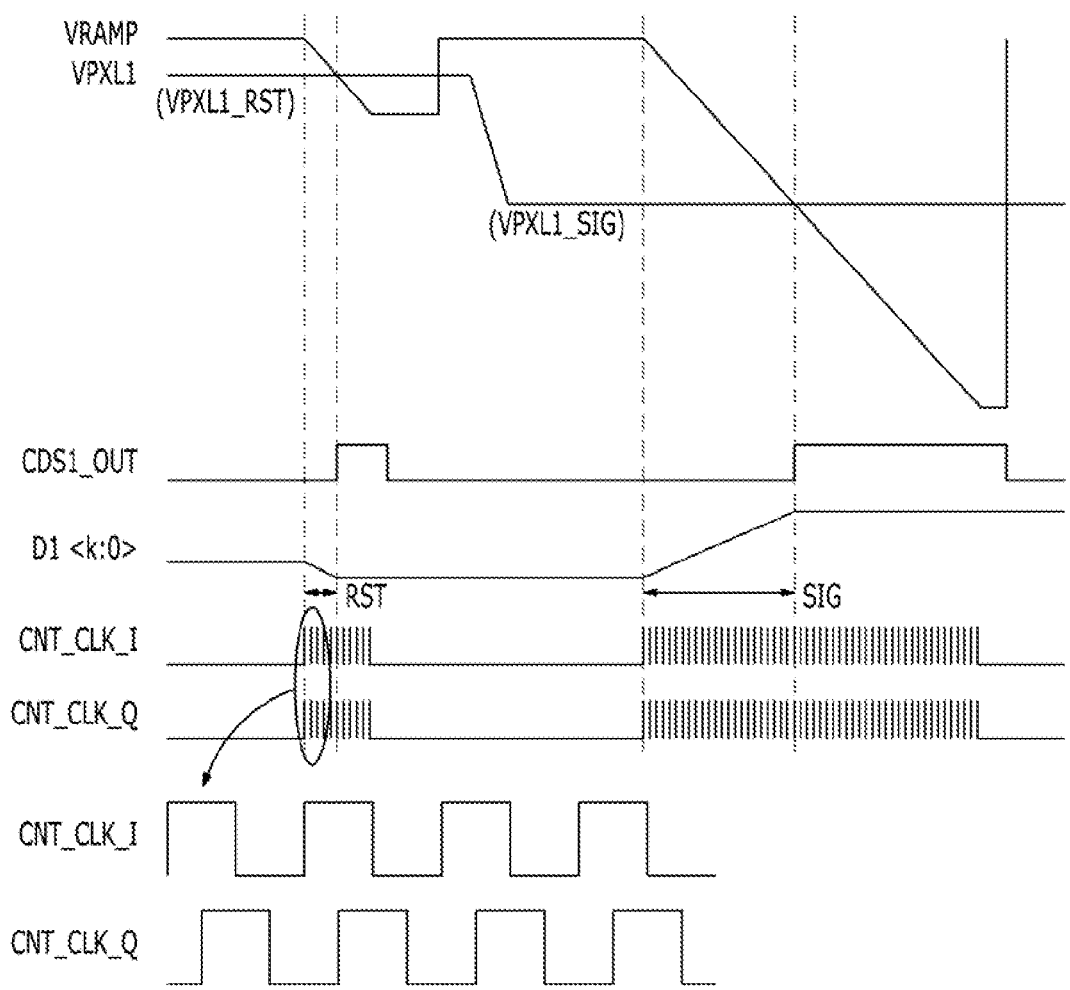
FIG. 2 is a timing diagram for describing an operation of the image sensing device shown in FIG. 1.
Figure 3:
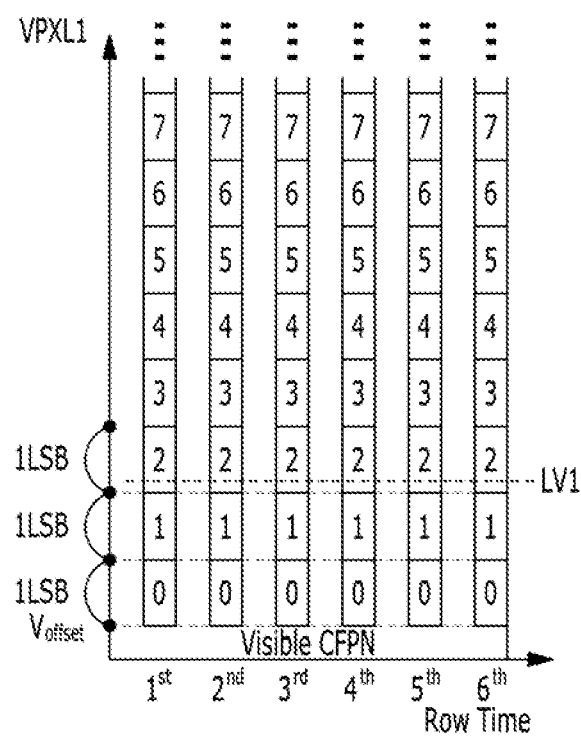
FIG. 3 is a graph for describing a concern of the image sensing device shown in FIG. 1.
Figure 4:
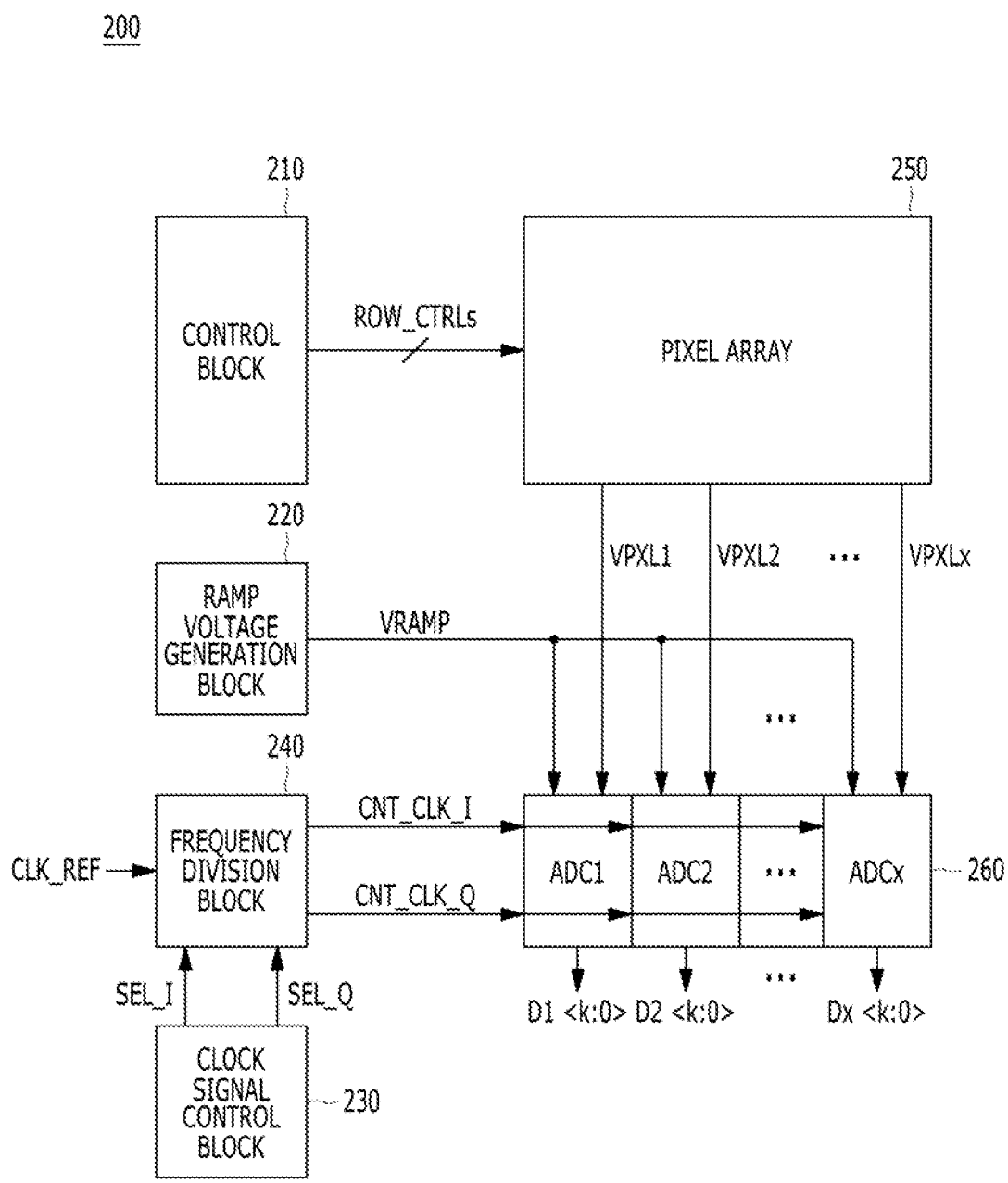
FIG. 4 is a block diagram illustrating an image sensing device in accordance with an embodiment of the present invention.

FIG. 4 is a block diagram illustrating an image sensing device 200 in accordance with an embodiment of the present invention.

Referring to FIG. 4, the image sensing device 200 may include a control block 210, a ramp voltage generation block 220, a clock signal control block 230, a frequency division block 240, a pixel array 250, and a pixel signal processing block 260.

The control block 210 may generate operation control signals ROW_CTRLs for controlling an operation of the pixel array 250 by rows for each unit row time.

The ramp voltage generation block 220 generates a ramp voltage VRAMP having a predetermined ramp up/down pattern for each unit row time. For example, the ramp voltage generation block 220 may generate the ramp voltage VRAMP increasing or dropping by a predetermined voltage for each unit row time.

The clock signal control block 230 may generate first and second clock control signals SEL_I and SEL_Q to have variable (or different) logic combinations for each unit row time. For example, the clock signal control block 230 may generate the first and second clock control signals SEL_I and SEL_Q of the logic combination corresponding to '0, 0' during a first unit row time, the first and second clock control signals SEL_I and SEL_Q of the logic combination corresponding to '1, 0' during a second unit row time, the first and second clock control signals SEL_I and SEL_Q of the logic combination corresponding to '1, 1' during a third unit row time, the first and second clock control signals SEL_I and SEL_Q of the logic combination corresponding to '1, 0' during a fourth unit row time, the first and second clock control signals SEL_I and SEL_Q of the logic combination corresponding to '0, 1' during a fifth unit row time, the first and second clock control signals SEL_I and SEL_Q of the logic combination corresponding to '0, 0' during a $(y-1)^{th}$ unit row time, and the first and second dock control signals SEL_I and SEL_Q of the logic combination corresponding to '0, 1' during a $y^{th}$ unit row time. Particularly, the clock signal control block 230 may generate the first and second clock control signals SEL_I and SEL_Q of irregular logic combinations during the first to $y^{th}$ unit row times, as described above. The clock signal control block 230 may generate the first and second clock control signals SEL_I and SEL_Q of four logic combinations including '0, 0', '0, 1', '1, 0' and '1, 1' at an equivalent rate during the first to $y^{th}$ unit row times. Herein, the first and second clock control signals SEL_I and SEL_Q of the random logic combinations, which are not regular, may be generated. The clock signal control block 230 may be a timing generator (TG) for controlling general operation timing of the image sensing device 200.

The frequency division block 240 may generate first and second control clock signals CNT_CLK_I and CNT_CLK_Q whose phases are controlled equally or differently during the unit row time in response to a reference clock signal CLK_REF and the first and second clock control signals SEL_I and SEL_Q. For example, the frequency division block 240 may generate the first and second control clock signals CNT_CLK_I and CNT_CLK_Q basically having a phase difference of approximately 90 degrees therebetween in response to the reference clock signal CLK_REF, and control a first delay time reflected in the first control clock signal CNT_CLK_I and a second delay time reflected in the second control clock signal CNT_CLK_Q for each unit row time in response to the first and second clock control signals SEL_I and SEL_Q.

The pixel array 250 may include x*y pixels (not shown) arranged in column and row directions, where x and y are natural numbers corresponding to the number of columns and rows, respectively. The pixel array 250 may sequentially output first to $x^{th}$ pixel signals VPXL1 to VPXLx by rows y times through first to $x^{th}$ column lines in response to the operation control signals ROW_CTRLs. For example, the pixel array 250 may output the first to $x^{th}$ pixel signals VPXL1 to VPXLx from first to $x^{th}$ pixels arranged in a first row through the first to $x^{th}$ column lines during a first unit row time, the first to $x^{th}$ pixel signals VPXL1 to VPXLx from the first to $x^{th}$ pixels arranged in a second row through the first to $x^{th}$ column lines during a second unit row time, and the first to $x^{th}$ pixel signals VPXL1 to VPXLx from first to $x^{th}$ pixels arranged in a $y^{th}$ row through the first to $x^{th}$ column lines during a $y^{th}$ unit row time.

The pixel signal processing block 260 may convert the first to $x^{th}$ pixel signals VPXL1 to VPXLx inputted for each unit row time into first to $x^{th}$ digital signals D1<k:0> to Dx<k:0> based on the ramp voltage VRAMP, the first control clock signal CNT_CLK_I and the second control clock signal CNT_CLK_Q. For example, the pixel signal processing block 260 may include first to $x^{th}$ analog-to-digital converters ADC1 to ADCx for converting the first to $x^{th}$ pixel signals VPL1 to VPXLx into the first to $x^{th}$ digital signals D1<k:0> to Dx<k:0>. The first to $x^{th}$ analog-to-digital converters ADC1 to ADCx may generate the first to $x^{th}$ digital signals D1<k:0> to Dx<k:0> that are analog-dithered based on the first control clock signal CNT_CLK_I and the second control clock signal CNT_CLK_Q whose phases are controlled equally or differently for each unit row time.

Figure 5:
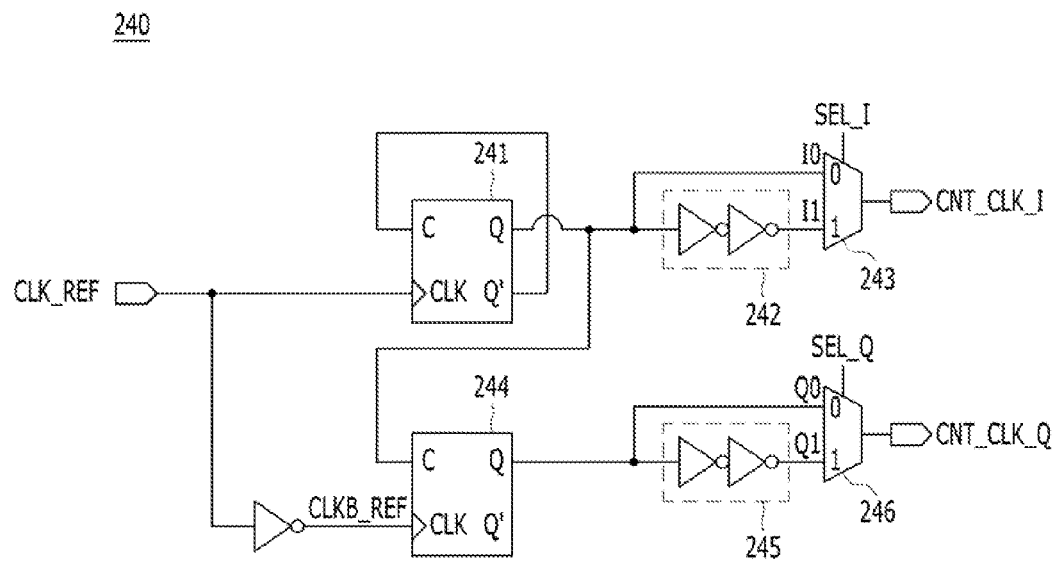
FIG. 5 is a detailed diagram of a frequency division block shown in FIG. 4.

FIG. 5 is a detailed diagram of the frequency division block 240 shown in FIG. 4.

Referring to FIG. 5, the frequency division block 240 may include a first division unit 241, a first delay unit 242, a first selection unit 243, a second division unit 244, a second delay unit 245, and a second selection unit 246.

The first division unit 241 may divide the reference clock signal CLK_REF at a predetermined division ratio to generate a first divided clock signal I0. For example, the first division unit 241 may generate the first divided clock signal I0 by dividing the frequency of the reference clock signal CLK_REF by 2. The first divided clock signal I0 may have the same phase as the reference clock signal CLK_REF.

The first delay unit 242 may delay the first divided clock signal I0 by a predetermined delay time to generate a first, delayed clock signal I1. The delay time may be shorter than a quarter of a cycle of the reference clock signal CLK_REF or one eighth of a cycle of the first divided clock signal I0.

The first selection unit 243 may output one of the first divided clock signal I0 and the first delayed clock signal I1 as the first control clock signal CNT_CLK_I in response to the first clock control signal SEL_I.

The second division unit 244 may divide a complementary reference clock signal CLKB_REF that is in an inverted relationship with the reference clock signal CLK_REF at a predetermined division ratio to generate a second divided clock signal Q0. For example, the second division unit 244 may generate the second divided clock signal Q0 by dividing the frequency of the complementary reference clock signal CLKB_REF by 2. The second divided clock signal Q0 may have the same phase as the complementary reference clock signal CLKB_REF.

The second delay unit 245 may delay the second divided clock signal Q0 by the delay time to generate a second delayed clock signal Q1.

The second selection unit 246 may output one of the second divided clock signal Q0 and the second delayed clock signal Q1 as the second control clock signal CNT_CLK_Q in response to the second clock control signal SEL_Q.

Figure 6:
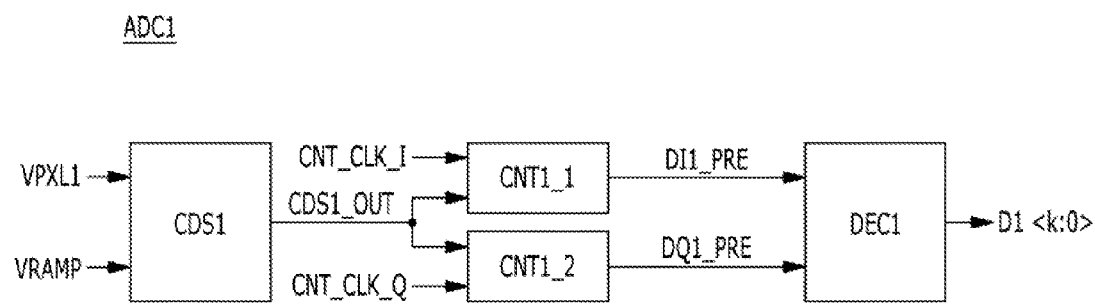
FIG. 6 is a detailed diagram of a first analog-to-digital converter shown in FIG. 4.

FIG. 6 is a detailed diagram of the pixel signal processing block 260 shown in FIG. 4. FIG. 6 representatively shows the first analog-to-digital converter ADC1 among the first to analog-to-digital converters ADC1 to ADCx included in the pixel signal processing block 260.

Referring to FIG. 6, the first analog-to-digital converter ADC1 may include a detection unit CDS1, a first counting unit CNT1_1, second counting unit CNT1_2, and a decoding unit DEC1.

The detection unit CDS1 may compare a voltage of the first pixel signal VPXL1 inputted for each unit row time with the ramp voltage VRAMP to generate a comparison signal CDS1_OUT. For example, the detection unit CDS1 may output the comparison signal CDS1_OUT that transitions from a logic low level to a logic high level when the ramp voltage VRAMP has the same level as the first pixel signal VPXL1.

The first counting unit CNT1_1 may count the first control clock signal CNT_CLK_I in response to the comparison signal CDS1_OUT for each unit row me to generate a first counting signal DI1_PRE. For example, the first counting unit CNT1_1 may count the first control clock signal CNT_CLK_I during a section ranging from when the ramp voltage VRAMP ramps down to when the comparison signal CDS1_OUT transitions, and output the first counting signal DI1_PRE corresponding to the counting result.

The second counting unit CNT1_2 may count the second control clock signal CNT_CLK_Q in response to the comparison signal CDS1_OUT for each unit row time to generate a second counting signal DQ1_PRE. For example, the second counting unit CNT1_2 may count the second control clock signal CNT_CLK_Q during a section ranging from when the ramp voltage VRAMP ramps down to when the comparison signal CDS1_OUT transitions, and output the second counting signal DQ1_PRE corresponding to the counting result.

The decoding unit DEC1 may decode the first counting signal DI1_PRE and the second counting signal DQ1_PRE to generate the first digital signal D1<k:0>.

Hereinafter, an operation of the image sensing device 200 having the aforementioned structure is described with reference to FIGS. 7 to 12.

Figure 7:
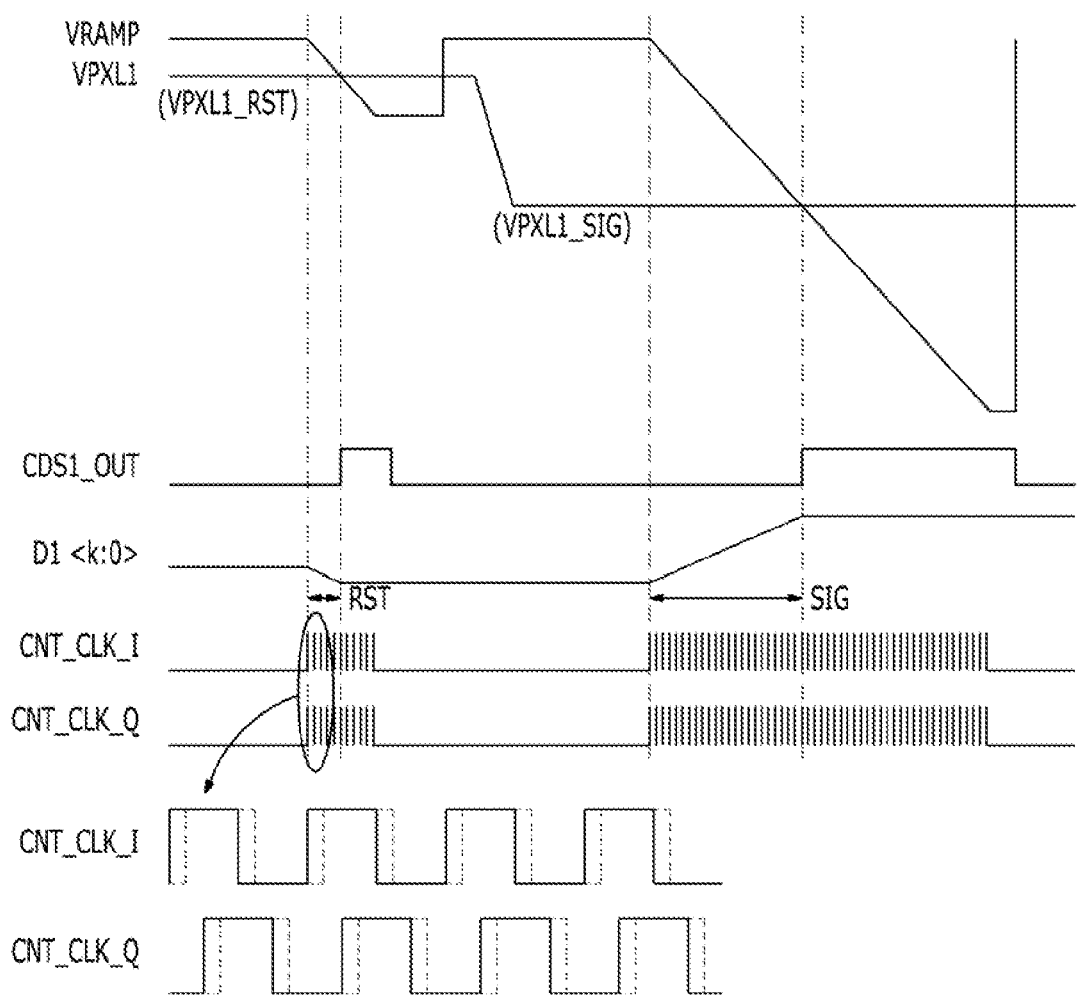
FIGS. 7 to 12 are diagrams for describing an operation of the image sensing device shown in FIG. 4.

FIG. 7 is a timing diagram for describing the operation of the image sensing device 200 shown in FIG. 4.

FIG. 7 representatively shows an operation of the first analog-to-digital converter ADC1 among the first to $x^{th}$ analog-to-digital converters ADC1 to ADCx.

Referring to FIG. 7, the pixel array 250 may output the first pixel signal VPXL1 from a pixel (not shown) corresponding to a first row and a first column during a first unit row time in response to the operation control signals ROW_CTRLs. The pixel array 250 outputs a first reset signal VPXL1_RST as the first pixel signal VPXL1 during a first reset period of the first unit row time and a first data signal VPXL1_SIG as the first pixel signal VPXL1 during a first read-out period of the first unit row time. The first read-out period is described below.

The first analog-to-digital converter ADC1 may detect a voltage of the first data signal VPXL1_SIG based on the ramp voltage VRAMP. For example, the first analog-to-digital converter ADC1 may generate the first digital signal D1<k:0> corresponding to a section ranging from when the ramp voltage VRAMP ramps down to when the ramp voltage VRAMP has the same level as the first data signal VPXL1_SIG. The first analog-to-digital converter ADC1 may generate the first digital signal D1<k:0> based on the first control clock signal CNT_CLK_I and the second control clock signal CNT_CLK_Q. The first control clock signal CNT_CLK_I and the second control clock signal CNT_CLK_Q may have a phase difference of approximately 90 degrees. Therefore, the first analog-to-digital converter ADC1 may generate the first digital signal D1<k:0> whose offset is controlled based on the phase difference between the first control clock signal CNT_CLK_I and the second control clock signal CNT_CLK_Q. This is described below in detail with reference to FIGS. 8 to 11D.

Figures 8, 9:
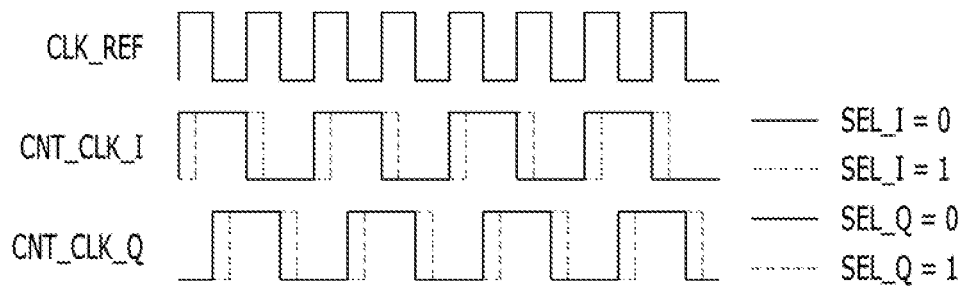

FIG. 8 is a table for describing an operation of the clock signal control block 230. FIG. 9 is a timing diagram for describing an operation of the frequency division block 240. FIGS. 10A to 10D are diagrams for describing an operation of the first analog-to-digital converter ADC1. FIGS. 11A to 11D are graphs describing the operation of the first analog-to-digital converter ADC1.

Referring to FIG. 8, the clock signal control block 230 may generate the first and second clock control signals SEL_I and SEL_Q having one of four logic combinations including '0, 0', '1, 0', '0, 1' and '1, 1' during the first unit row time. The four logic combinations may indicate four modes.

When the first and second dock control signals SEL_I and SEL_Q have the logic combination of '0, 0', the logic combination may indicate a normal mode. When the first and second dock control signals SEL_I and SEL_Q have the logic combination of '1, 0', the logic combination may indicate a first dithering mode. When the first and second clock control signals SEL_I and SEL_Q have the logic combination of '0, 1', the logic combination may indicate a second dithering mode. When the first and second clock control signals SEL_I and SEL_Q have the logic combination of '1, 1', the logic combination may indicate a third dithering mode.

Referring to FIG. 9, the frequency division block 240 may generate the first and second control clock signals CNT_

CLK_I and CNT_CLK_Q having a phase difference of approximately 90 degrees during the first unit row time in response to the reference clock signal CLK_REF and the first and second clock control signals SEL_I and SEL_Q.

When the first and second clock control signals SEL_I and SEL_Q have the logic combination of '0, 0' corresponding to the normal mode during the first unit row time, the frequency division block 240 may generate the first control clock signal CNT_CLK_I which has the same phase as the reference clock signal CLK_REF and the second control clock signal CNT_CLK_Q which has the same phase as the complementary reference clock signal CLKB_REF. The frequency division block 240 may be of a state where the first and second delay times are not reflected when the first control clock signal CNT_CLK_I and the second control clock signal CNT_CLK_Q are generated. Therefore, there may be the phase difference of approximately 90 degrees between the first control clock signal CNT_CLK_I and the second control clock signal CNT_CLK_Q.

When the first and second clock control signals SEL_I and SEL_Q have the logic combination of '1, 0' corresponding to the first dithering mode during the first unit row time, the frequency division block 240 may generate the first control clock signal CNT_CLK_I whose phase is delayed by approximately 45 degrees as compared with the reference clock signal CLK_REF and the second control clock signal CNT_CLK_Q which has the same phase as the complementary reference clock signal CLKB_REF. The frequency division block 240 may be of a state where the first delay time is reflected when the first control clock signal CNT_CLK_I is generated and of a state where the second delay time is not reflected when the second control clock signal CNT_CLK_Q is generated. Therefore, there may be the phase difference of approximately 45 degrees between the first control clock signal CNT_CLK_I and the second control clock signal CNT_CLK_Q.

When the first and second clock control signals SEL_I and SEL_Q have the logic combination of '0, 1' corresponding to the second dithering mode during the first unit row time, the frequency division block 240 may generate the first control clock signal CNT_CLK_I which has the same phase as the reference clock signal CLK_REF and the second control clock signal CNT_CLK_Q whose phase is delayed by approximately 45 degrees as compared with the complementary reference clock signal CLKB_REF. The frequency division block 240 may be of a state where the first delay time is not reflected when the first control clock signal CNT_CLK_I is generated and of a state where the second delay time is reflected when the second control clock signal CNT_CLK_Q is generated. Therefore, there may be the phase difference of approximately 135 degrees between the first control clock signal CNT_CLK_I and the second control clock signal CNT_CLK_Q.

When the first and second clock control signals SEL_I and SEL_Q have the logic combination of '1, 1' corresponding to the third dithering mode during the first unit row time, the frequency division block 240 may generate the first control clock signal CNT_CLK_I whose phase is delayed by approximately 45 degrees as compared with the reference clock signal CLK_REF and the second control clock signal CNT_CLK_Q whose phase is delayed by approximately 45 degrees as compared with the complementary reference clock signal CLKB_REF. The frequency division block 240 may be of a state where the first delay time is reflected when the first control clock signal CNT_CLK_I is generated and of a state where the second delay time is reflected when the second control clock signal CNT_CLK_Q is generated. Therefore, there may be the phase difference of approximately 90 degrees between the first control clock signal CNT_CLK_I and the second control clock signal CNT_CLK_Q.

Figure 10A:
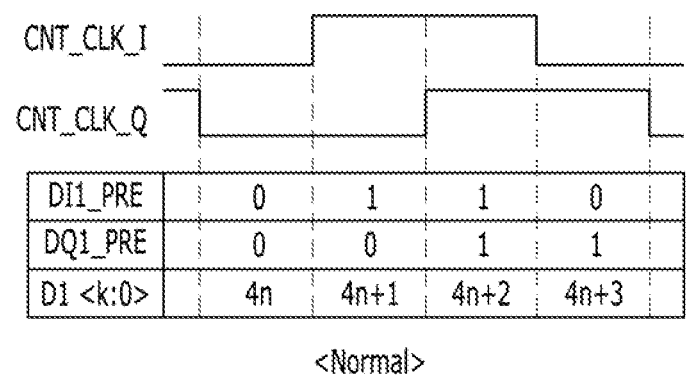

Referring to FIG. 10A, the first analog-to-digital converter ADC1 may convert the first pixel signal VPXL1 into the first digital signal D1<k:0> in response to the first control clock signal CNT_CLK_I and the second control clock signal CNT_CLK_Q corresponding to the normal mode. Since there is the phase difference of approximately 90 degrees between the first control clock signal CNT_CLK_I and the second control clock signal CNT_CLK_Q, conversion ranges by codes of the first digital signal D1<k:0> may be the same. In other words, since the logic combinations of the first control clock signal CNT_CLK_I and the second control clock signal CNT_CLK_Q have the same distribution, the conversion ranges by codes of the first digital signal D1<k:0> may be the same.

Figure 10B:
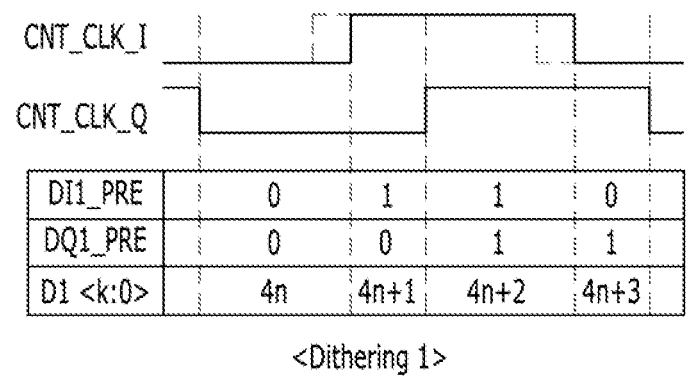

Referring to FIG. 10B, the first analog-to-digital converter ADC1 may convert the first pixel signal VPXL1 into the first digital signal D1<k:0> in response to the first control clock signal CNT_CLK_I and the second control clock signal CNT_CLK_Q corresponding to the first dithering mode. Since there is the phase difference of approximately 45 degrees between the first control clock signal CNT_CLK_I and the second control clock signal CNT_CLK_Q, conversion ranges by codes of the first digital signal D1<k:0> may be different. In other words, since the logic combinations of the first control clock signal CNT_CLK_I and the second control clock signal CNT_CLK_Q have different distributions, the conversion ranges by codes of the first digital signal D1<k:0> may be different from each other.

Figure 10C:
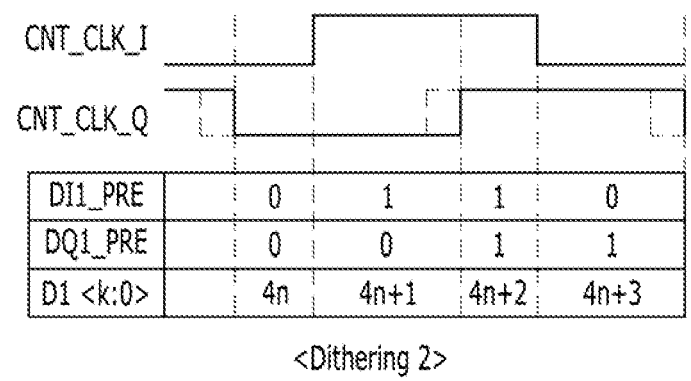

Referring to FIG. 10C, the first analog-to-digital converter ADC1 may convert the first pixel signal VPXL1 into the first digital signal D1<k:0> in response to the first control clock signal CNT_CLK_I and the second control clock signal CNT_CLK_Q corresponding to the second dithering mode. Since there is the phase difference of approximately 135 degrees between the first control clock signal CNT_CLK_I and the second control clock signal' CNT_CLK_Q, conversion ranges by codes of the first digital signal D1<k:0> may be different. In other words, since the logic combinations of the first control clock signal CNT_CLK_I and the second control clock signal CNT_CLK_Q have different distributions, the conversion ranges by codes of the first digital signal D1<k:0> may be different.

Figure 10D:
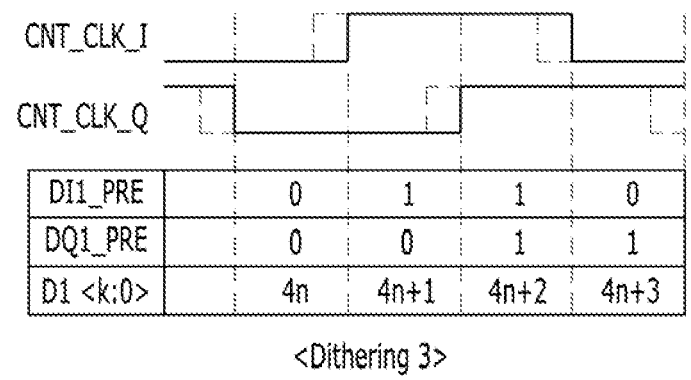

Referring to FIG. 10D, the first analog-to-digital converter ADC1 may convert the first pixel signal VPXL1 into the first digital signal D1<k:0> in response to the first control clock signal CNT_CLK_I and the second control clock signal CNT_CLK_Q corresponding to the third dithering mode. Since there is the phase difference of approximately 90 degrees between the first control clock signal CNT_CLK_I and the second control clock signal CNT_CLK_Q, conversion ranges by codes of the first digital signal D1<k:0> may be the same. In other words, since the logic combinations of the first control clock signal CNT_CLK_I and the second control clock signal CNT_CLK_Q have the same distribution, the conversion ranges by codes of the first digital signal D1<k:0> may be the same.

The conversion ranges by codes of the first digital signal D1<k:0> in the normal mode and the conversion ranges by codes of the first digital signal D1<k:0> in the third dithering mode may be the same. However, conversion sections by codes of the first digital signal D1<k:0> corresponding to the voltage of the first pixel signal VPXL1 in the normal mode and conversion sections by codes of the first digital signal D1<k:0> corresponding to the voltage of the first pixel signal VPXL1 in the third dithering mode may be different.

Figure 11A:
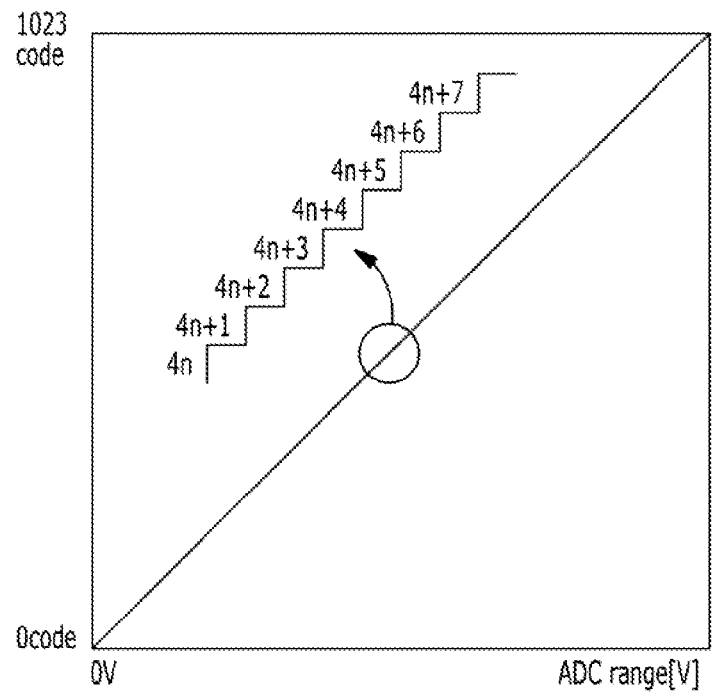

Referring to FIG. 11A, in the normal mode, intervals between digital codes 0 code to 1023 code corresponding to the first digital signal D1<k:0> and intervals of an analog range ADC range corresponding to the voltage of the first pixel signal VPXL1 may correspond at the same rate. Therefore, when the first control clock signal CNT_CLK_I and the second control clock signal CNT_CLK_Q corresponding to the normal mode are inputted, a code offset corresponding to the first analog-to-digital converter ADC1's own offset (hereinafter referred to as a "first offset") may be reflected in the first digital signal D1<k:0>.

Figure 11B:
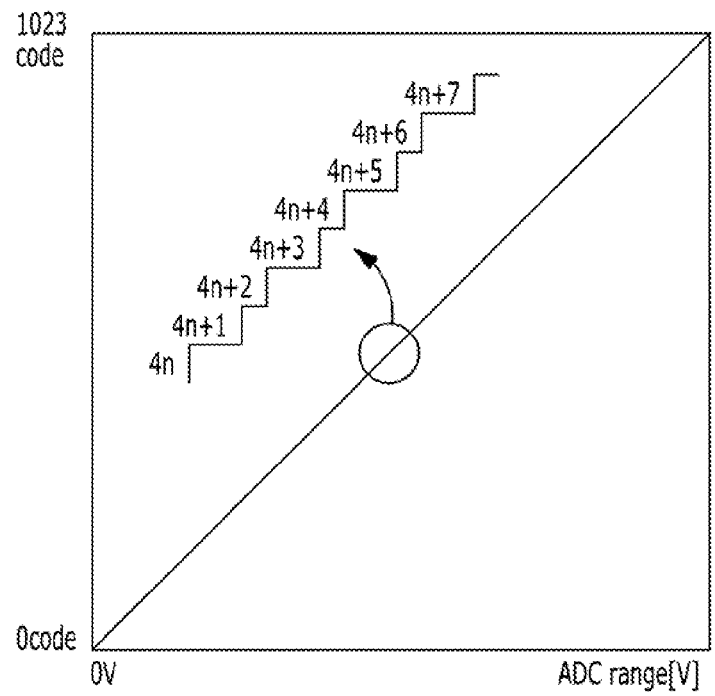

Referring to FIG. 11B, in the first dithering mode, intervals between digital codes 0 code to 1023 code corresponding to the first digital signal D1<k:0> and intervals of an analog range ADC range corresponding to the voltage of the first pixel signal VPXL1 may correspond at different rates. Therefore, when the first control clock signal CNT_CLK_I and the second control clock signal CNT_CLK_Q corresponding to the first dithering mode are inputted, a code offset corresponding to a second offset that is different from the first offset may be reflected in the first digital signal D1<k:0>.

Figure 11C:
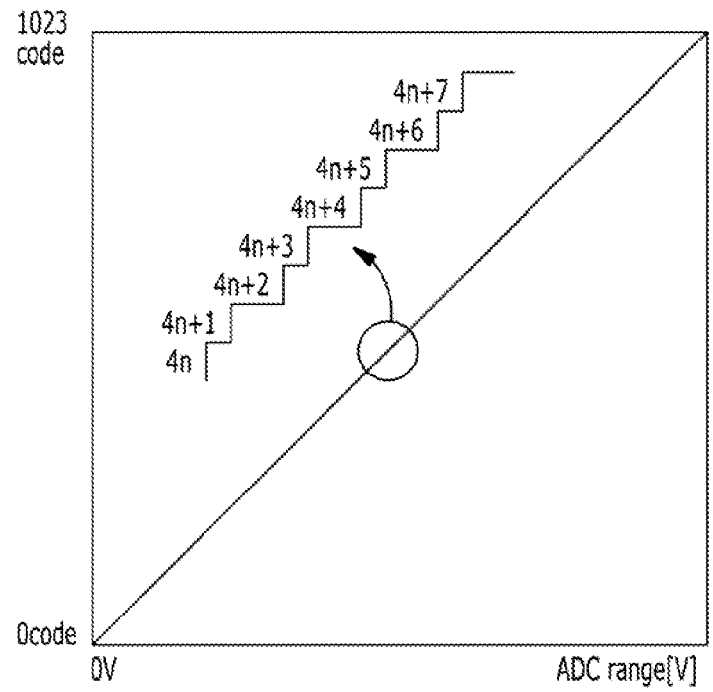

Referring to FIG. 11C, in the second dithering mode, intervals between digital codes 0 code to 1023 code corresponding to the first digital signal D1<k:0> and intervals of an analog range ADC range corresponding to the voltage of the first pixel signal VPXL1 may correspond to each other at different rates. Therefore, when the first control clock signal CNT_CLK_I and the second control clock signal CNT_CLK_Q corresponding to the second dithering mode are inputted, a code offset corresponding to a third offset that is different from the first offset may be reflected in the first digital signal D1<k:0>.

Figure 11D:
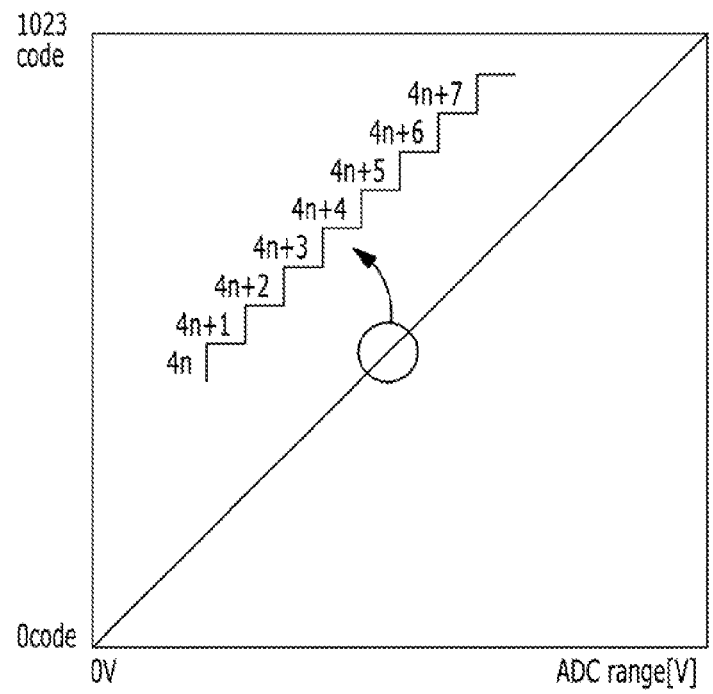

Referring to FIG. 11D, in the third dithering mode, intervals between digital codes 0 code to 1023 code corresponding to the first digital signal D1<k:0> and intervals of an analog range ADC range corresponding to the voltage of the first pixel signal VPXL1 may correspond to each other at the same rate. The analog range ADC range may be shifted in the third dithering mode as compared with the normal mode. Therefore, when the first control clock signal CNT_CLK_I and the second control clock signal CNT_CLK_Q corresponding to the third dithering mode are inputted, a code offset corresponding to a fourth offset that is different from the first offset may be reflected in the first digital signal D1<k:0>.

Subsequently, although not illustrated in the drawings, the pixel array 250 sequentially outputs the first pixel signal VPXL1 from the pixels (not shown) arranged in the second to $y^{th}$ rows and the first column during the second to $y^{th}$ unit row times in response to the operation control signals ROW_CTRLs. Then, the first analog-to-digital converter ADC1 may sequentially generate the first digital signal D1<k:0> during the second to $y^{th}$ unit row times through the same process as above. The first analog-to-digital converter ADC1 may generate the first digital signal D1<k:0> based on different modes including the normal mode, the first dithering mode, the second dithering mode and the third dithering mode each of the unit row times.

Accordingly, variable (or different) code offsets for each unit row time may be reflected in the first digital signal D1<k:0> that is sequentially generated corresponding to the first column.

Figure 12:
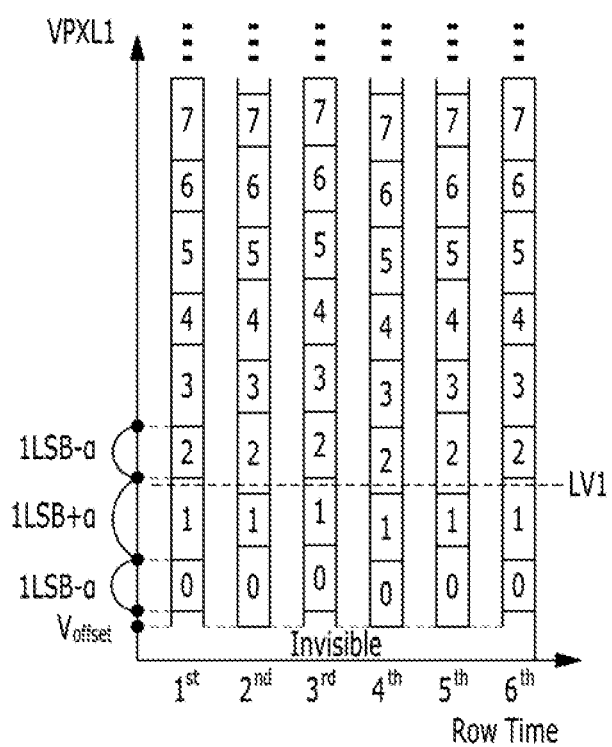

FIG. 12 is a graph for describing the code offset reflected in the first pixel signal VPXL1.

Referring to FIG. 12, a horizontal axis indicates unit row times, and a vertical axis indicates a voltage of the first pixel signal \MM. For convenience, the numbers 0, 1, 2, 3, 4, 5, 6, 7, . . . shown in the graph indicates the first digital signal D1<k:0> corresponding to the voltage of the first pixel signal VPXL1 as decimal numbers.

When the first pixel signal VPXL1 having the same voltage LV1 is generated for each unit row time, the first analog-to-digital converter ADC1 may generate the first digital signal D1<k:0> corresponding to the decimal number '1' or '2' for each unit row time. The first analog-to-digital converter ADC1 may irregularly generate the first digital signal D1<k:0> corresponding to the decimal number '1' or '2' for each unit row time.

In accordance with an embodiment of the present invention, offsets of an analog-to-digital converter occurring by columns may be reflected differently each unit row time. Consequently, since a result of realizing an analog dithering concept may be obtained, there is an advantage of blurring column fixed pattern noise (CFPN).

Figure 13:
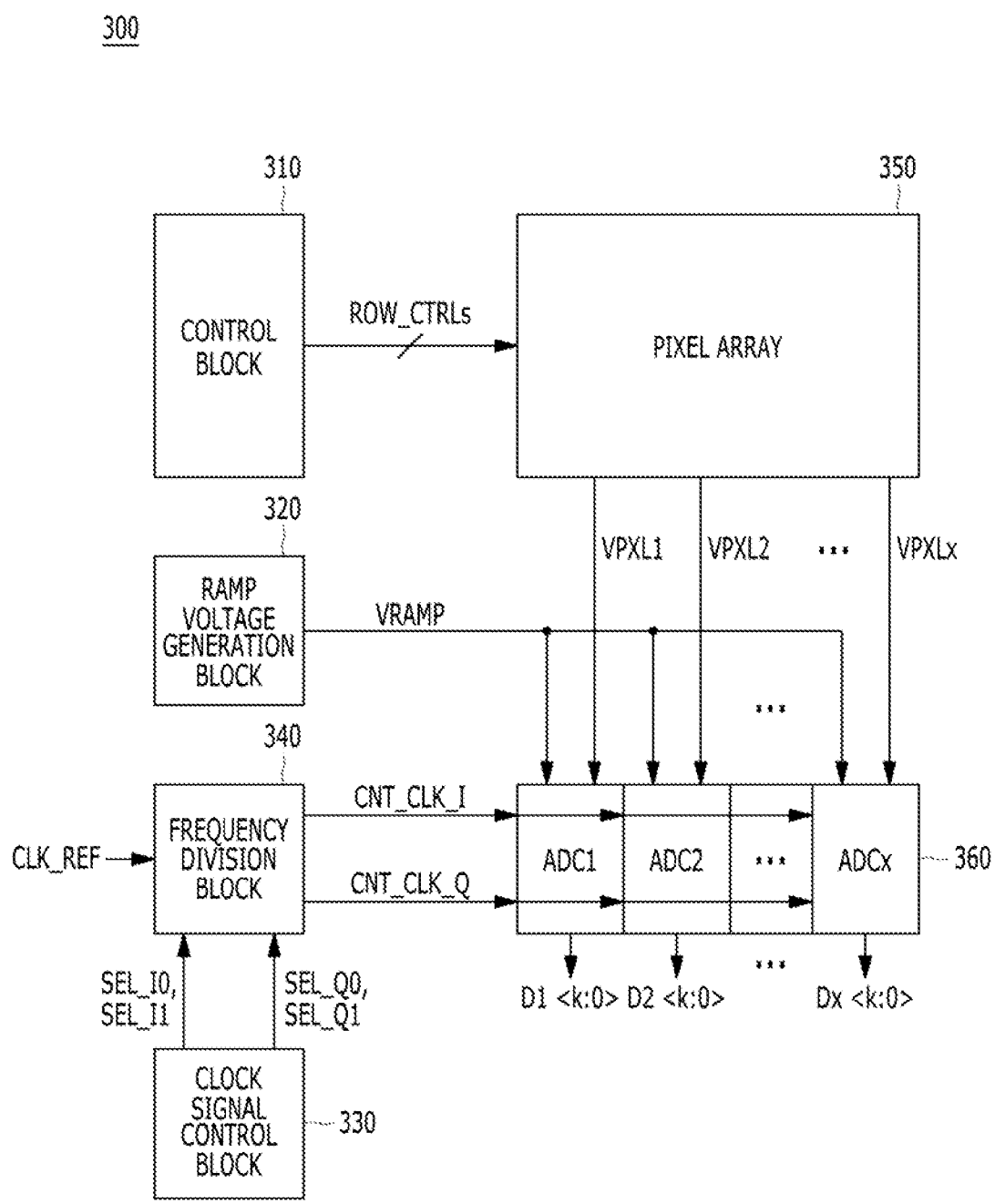
FIG. 13 is a block diagram illustrating an image sensing device in accordance with an embodiment of the present invention.

FIG. 13 is a block diagram illustrating an image sensing device 300 in accordance with an embodiment of the present invention.

Referring to FIG. 13, the image sensing device 300 may include a control block 310, a ramp voltage generation block 320, a clock signal control block 330, a frequency division block 340, a pixel array 350, and a pixel signal processing block 360.

Since the control block 310, the ramp voltage generation block 320 the pixel array 350, and the pixel signal processing block 360 are the same as the control block 210, the ramp voltage generation block 220, the pixel array 250, and the pixel signal processing block 260 described as above, there descriptions have been omitted.

The clock signal control block 330 may generate first to fourth clock control signals SEL_I0, SEL_Q0, SEL_I1 and SEL_Q1 to have variable (or different) logic combinations for each unit row time. Particularly, the clock signal control block 330 may generate the first to fourth clock control signals SEL_I0, SEL_Q0, SEL_I1 and SEL_Q1 of irregular logic combinations for each unit row time. The clock signal control block 330 may generate the first to fourth clock control signals SEL_I0, SEL_Q0, SEL_I1 and SEL_Q1 of 16 logic combinations including '0, 0, 0, 0', '0, 0, 0, 1', '0, 0, 1, 0', '0, 0, 1, 1', '0, 1, 0, 0', '0, 1, 0, 1', '0, 1, 1, 0', '0, 1, 1, 1', '1, 0, 0, 0', '1, 0, 0, 1', '1, 0, 1, 0', '1, 0, 1, 1', '1, 1, 0, 0', '1, 1, 0, 1', '1, 1, 1, 0' and '1, 1, 1, 1' at an equivalent rate during the entire unit row times. The first to fourth clock control signals SEL_I0, SEL_Q0, SEL_I1 and SEL_Q1 of the random logic combinations, which are not regular, may be generated during the entire nit row times.

Figure 14:
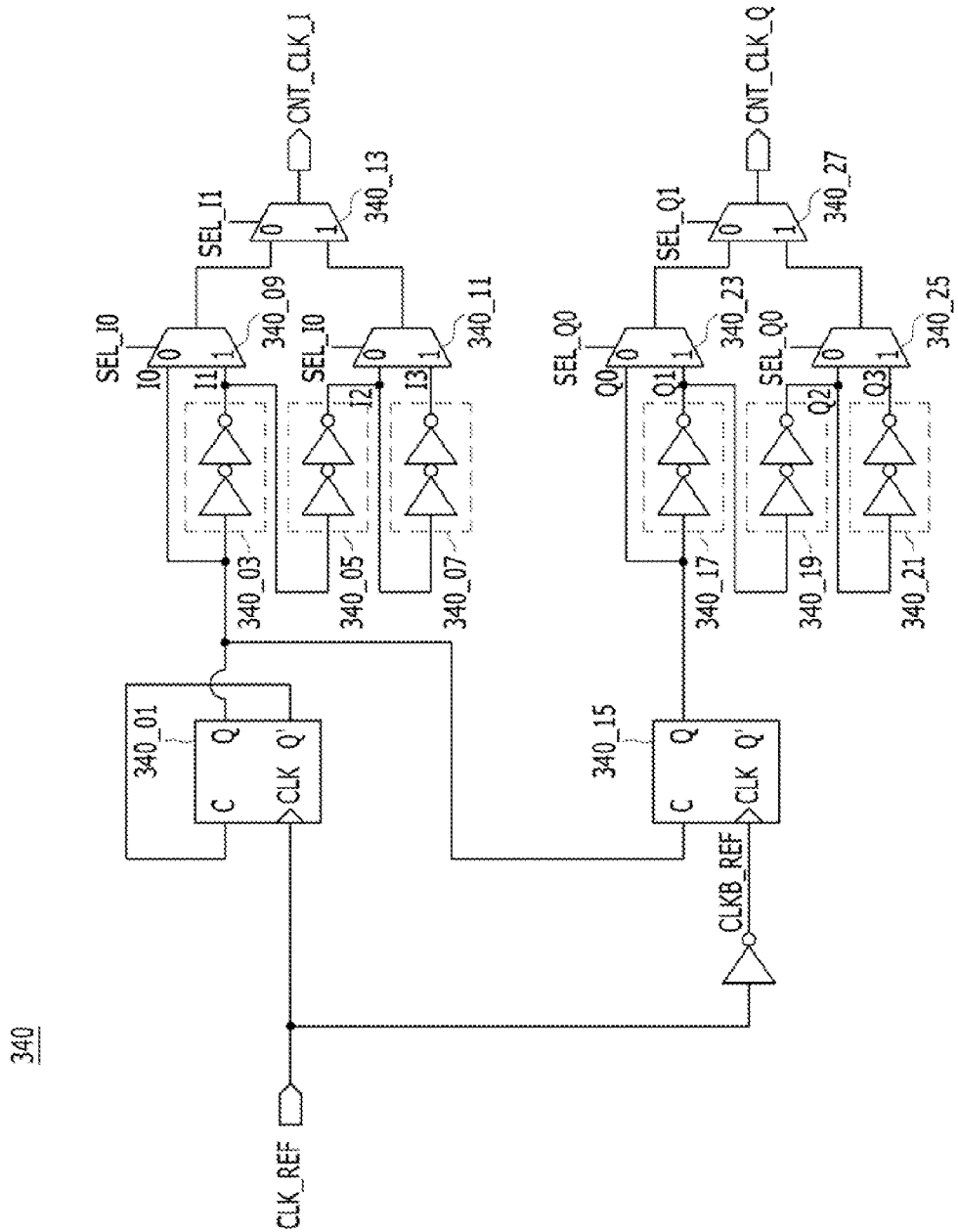
FIG. 14 is a detailed diagram of a frequency division block shown in FIG. 13.

FIG. 14 is a detailed diagram of the frequency division block 340 shown in FIG. 13.

Referring to FIG. 14, the frequency division block 340 may include a first division unit 340_01, a first delay unit 340_03, a second delay unit 340_05, a third delay unit 340_07, a first selection unit 340_09, a second selection unit 340_11, a third selection unit 340_13, a second division unit 340_15, a fourth delay unit 340_17, a fifth delay unit 340_19, a sixth delay unit 340_21, a fourth selection unit 340_23, a fifth selection unit 340_25, and a sixth selection unit 340_27.

The first division unit 340_01 may divide a reference clack signal CLK_REF at a predetermined division ratio to generate a first divided clock signal I0. For example, the first division unit 340_01 may generate the first divided clock signal I0 by dividing the frequency of the reference clock signal CLK_REF by 2. The first divided clock signal I0 may have the same phase as the reference clock signal CLK_REF.

The first delay unit 340_03 may delay the first divided clock signal I0 by a predetermined delay time to generate a first delayed clock signal I1. The delay time may be shorter than one $12^{th}$ of a cycle of the reference clock signal CLK_REF or one $24^{th}$ of a cycle of the first divided clock signal I0.

The second delay unit 340_05 may delay the first delayed clock signal I1 by the delay time to generate a second delayed clock signal I2.

The third delay unit 340_07 may delay the second delayed clock signal I2 by the delay time to generate a third delayed clock signal I3.

The first selection unit 340_09 may output one of the first divided clock signal I0 and the first delayed clock signal I1 as a first selection clock signal in response to the first clock control signal SEL_I0.

The second selection unit 340_11 may output one of the second delayed clock signal I2 and the third delayed clock signal I3 as a second selection clock signal in response to the first clock control signal SEL_I0.

The third selection unit 340_13 may output one of the first selection clock signal and the second selection clock signal as a first control clock signal CNT_CLK_I in response to the third clock control signal SEL_I1.

The second division unit 340_15 may divide a complementary reference clock signal CLKB_REF at a predetermined division ratio to generate a second divided clock signal Q0. For example, the second division unit 340_15 may generate the second divided clock signal Q0 by dividing the frequency of the complementary reference clock signal CLKB_REF by 2. The second divided clock signal Q0 may have the same phase as the complementary reference clock signal CLKB_REF.

The fourth delay unit 340_17 may delay the second divided clock signal Q0 by the delay time to generate a fourth delayed clock signal Q1.

The fifth delay unit 340_19 may delay the fourth delayed clock signal Q1 by the delay time to generate a fifth delayed clock signal Q2.

The sixth delay unit 340_21 may delay the fifth delayed clock signal Q2 by the delay time to generate a sixth delayed clock signal Q3.

The fourth selection unit 340_23 may output one of the second divided clock signal Q0 and the fourth delayed clock signal as a third selection clock signal in response to the second clock control signal SEL_Q0.

The fifth selection unit 340_25 may output one of the fifth delayed clock signal Q2 and the sixth delayed clock signal Q3 as a fourth selection clock signal in response to the second clock control signal SEL_Q0.

The sixth selection unit 340_27 may output one of the third selection clock signal and the fourth selection clock signal as a second control clock signal CNT_CLK_Q in response to the fourth clock control signal SEL_Q1.

Since the operation of the image sensing device 300 can be understood by those skilled in the art by reference to the image sensing device 200 shown in FIG. 4, its detailed description has been omitted.

In accordance with the image sensing device 300, an analog dithering concept is expanded as compared with the image sensing device shown in FIG. 4. As offsets of an analog-to-digital converter is controlled in various modes for each unit row time, there is an advantage of effectively blurring column fixed pattern noise (CFPN).

While the present invention has been described with respect to specific embodiments, the embodiments are not intended to be restrictive, but rather descriptive. Further, it is noted that the present invention may be achieved in various ways through substitution, change, and modification, by those skilled in the art without departing from the scope of the present invention as defined by the following claims.

What is claimed is:

1. An image sensing device, comprising:
    a clock signal control block configured to generate first and second clock control signals to have variable logic combinations for each unit row time, wherein the clock signal control block generates the first and second clock control signals of irregular logic combinations;
    a frequency division block configured to generate first and second clock signals having different phases based on a reference clock signal, and control a first delay time reflected in the first clock signal and a second delay time reflected in the second clock signal for each unit row time based on the first and second clock control signals; and
    a pixel signal processing block configured to convert a pixel signal inputted for each unit row time into a digital signal based on the first and second clock signals,
    wherein the digital signal generated by the pixel signal processing block is analog-dithered based on the first and second clock signals whose phases are controlled differently for each unit row time.

2. The image sensing device of claim 1, wherein the frequency division block irregularly controls the first and second delay times.

3. The image sensing device of claim 1, wherein the frequency division block includes:
    a first division unit configured to divide the frequency of the reference clock signal by 2 to generate a first divided clock signal;
    a first delay unit configured to delay the first divided clock signal by a predetermined delay time to generate a first delayed clock signal;
    a first selection unit configured to select one of the first divided clock signal and the first delayed clock signal as the first clock signal based on the first clock control signal;
    a second division unit configured to divide the frequency of an inverted signal of the reference clock signal by 2 to generate a second divided clock signal;
    a second delay unit configured to delay the second divided clock signal by the predetermined delay time to generate a second delayed clock signal; and
    a second selection unit configured to select one of the second divided clock signal and the second delayed clock signal as the second clock signal based on the second clock control signal.

4. The image sensing device of claim 3, wherein the predetermined delay time is shorter than a quarter of a cycle of the reference clock signal.

5. The image sensing device of claim 1, wherein the clock signal control block further generates a third clock control signal and a fourth clock control signal to have variable logic combinations for each unit row time, and
    the frequency division block irregularly controls the first and second delay times for each unit row time based on the first to fourth clock control signals.

6. The image sensing device of claim 5, wherein the frequency division block includes:

a first division unit configured to divide the frequency of the reference clock signal by 2 to generate a first divided clock signal;
a first delay unit configured to delay the first divided clock signal by a predetermined delay time to generate a first delayed clock signal;
a second delay unit configured to delay the first delayed clock signal by the predetermined delay time to generate a second delayed clock signal;
a third delay unit configured to delay the second delayed clock signal by the predetermined delay time to generate a third delayed clock signal;
a first selection unit configured to select one of the first divided clock signal and the first delayed clock signal as a first selection clock signal based on the first clock control signal;
a second selection unit configured to select one of the second delayed clock signal and the third delayed clock signal as a second selection clock signal based on the first clock control signal;
a third selection unit configured to select one of the first selection clock signal and the second selection clock signal as the first clock signal based on the third clock control signal;
a second division unit configured to divide the frequency of an inverted signal of the reference clock signal by 2 to generate a second divided clock signal;
a fourth delay unit configured to delay the second divided clock signal by the predetermined delay time to generate a fourth delayed clock signal;
a fifth delay unit configured to delay the fourth delayed clock signal by the predetermined delay time to generate a fifth delayed clock signal;
a sixth delay unit configured to delay the fifth delayed clock signal by the predetermined delay time to generate a sixth delayed clock signal;
a fourth selection unit configured to select one of the second divided clock signal and the fourth delayed clock signal as a third selection clock signal based on the second clock control signal;
a fifth selection unit configured to select one of the fifth delayed clock signal and the sixth delayed clock signal as a fourth selection clock signal based on the second clock control signal; and
a sixth selection unit configured to select one of the third selection clock signal and the fourth selection clock signal as the second clock signal based on the fourth clock control signal.

7. The image sensing device of claim 6, wherein the predetermined delay time is shorter than a quarter of a cycle of the reference clock signal.

8. An image sensing device, comprising:
a pixel array configured to output a pixel signal by rows for each unit row time;
a ramp voltage generation block configured to generate a ramp voltage having a predetermined ramp up/down pattern for each unit row time, wherein the ramp voltage generation block generates the ramp voltage increasing or dropping by a predetermined voltage for each unit row time; and
a pixel signal processing block configured to convert the pixel signal into a digital signal based on first and second divided clock signals, wherein the digital signal is analog-dithered based on the first and second divided clock signals whose phases are differently controlled for each unit row time.

9. The image sensing device of claim 8, further comprising:
a clock signal control block configured to generate first and second clock control signals to have variable logic combinations for each unit row time, wherein the clock signal control block generates the first and second clock control signals of irregular logic combinations; and
a frequency division block configured to generate the first and second divided clock signals with different phases based on a reference clock signal and control a first delay time reflected in the first clock signal and a second delay time reflected in the second clock signal for each unit row time based on the first and second clock control signals.

10. The image sensing device of claim 9, wherein the frequency division block irregularly controls the first and second delay time.

11. The image sensing device of claim 9, wherein the frequency division block includes:
a first division unit configured to divide the frequency of the reference clock signal by 2 to generate a first divided clock signal;
a first delay unit configured to delay the first divided clock signal by a predetermined delay time to generate a first delayed clock signal;
a first selection unit configured to select one of the first divided clock signal and the first delayed clock signal as the first clock signal based on the first clock control signal;
a second division unit configured to divide the frequency of an inverted signal of the reference clock signal by 2 to generate a second divided clock signal;
a second delay unit configured to delay the second divided clock signal by the predetermined delay time to generate a second delayed clock signal; and
a second selection unit configured to select one of the second divided clock signal and the second delayed clock signal as the second clock signal based on the second clock control signal.

12. The image sensing device of claim 11, wherein the predetermined delay time is shorter than a quarter of a cycle of the reference clock signal.

13. The image sensing device of claim 9, wherein the clock signal control block further generates a third clock control signal and a fourth clock control signal to have variable logic combinations for each unit row time, and
the frequency division block irregularly controls the first and second delay times for each unit row time based on the first to fourth clock control signals.

14. The image sensing device of claim 13, wherein the frequency division block includes:
a first division unit configured to divide the frequency of the reference clock signal by 2 to generate a first divided clock signal;
a first delay unit configured to delay the first divided clock signal by a predetermined delay time to generate a first delayed clock signal;
a second delay unit configured to delay the first delayed clock signal by the predetermined delay time to generate a second delayed clock signal;
a third delay unit configured to delay the second delayed clock signal by the predetermined delay time to generate a third delayed clock signal;
a first selection unit configured to select one of the first divided clock signal and the first delayed clock signal as a first selection clock signal based on the first clock control signal;

a second selection unit configured to select one of the second delayed clock signal and the third delayed clock signal as a second selection clock signal based on the first clock control signal;

a third selection unit configured to select one of the first selection clock signal and the second selection clock signal as the first clock signal based on the third clock control signal;

a second division unit configured to divide the frequency of an inverted signal of the reference clock signal by 2 to generate a second divided clock signal;

a fourth delay unit configured to delay the second divided clock signal by the predetermined delay time to generate a fourth delayed clock signal;

a fifth delay unit configured to delay the fourth delayed clock signal by the predetermined delay time to generate a fifth delayed clock signal;

a sixth delay unit configured to delay the fifth delayed clock signal by the predetermined delay time to generate a sixth delayed clock signal;

a fourth selection unit configured to select one of the second divided clock signal and the fourth delayed clock signal as a third selection clock signal based on the second clock control signal;

a fifth selection unit configured to select one of the fifth delayed clock signal and the sixth delayed clock signal as a fourth selection clock signal based on the second clock control signal; and a sixth selection unit configured to select one of the third selection clock signal and the fourth selection clock signal as the second clock signal based on the fourth clock control signal.

15. The image sensing device of claim 14, wherein the predetermined delay time is shorter than one $12^{th}$ of a cycle of the reference clock signal.

* * * * *